(12) United States Patent
May et al.

(10) Patent No.: US 7,972,201 B2
(45) Date of Patent: Jul. 5, 2011

(54) RUCKERS CAPABLE OF RUCKING FIXED DIAMETER COVERINGS AND ASSOCIATED DEVICES, METHODS, SYSTEMS AND COMPUTER PROGRAM PRODUCTS

(75) Inventors: Dennis J. May, Pittsboro, NC (US); Samuel D. Griggs, Raleigh, NC (US); Matthew Lowder, Durham, NC (US)

(73) Assignee: Tipper Tie, Inc., Apex, NC (US)

( * ) Notice: Subject to any disclaimer, the term of this patent is extended or adjusted under 35 U.S.C. 154(b) by 0 days.

(21) Appl. No.: 12/723,017

(22) Filed: Mar. 12, 2010

(65) Prior Publication Data
US 2010/0167898 A1 Jul. 1, 2010

Related U.S. Application Data

(62) Division of application No. 11/456,356, filed on Jul. 10, 2006, now Pat. No. 7,704,129.

(60) Provisional application No. 60/698,568, filed on Jul. 12, 2005.

(51) Int. Cl.
*A22C 11/00* (2006.01)

(52) U.S. Cl. ........................................................ 452/32

(58) Field of Classification Search .............. 452/21–23, 452/25, 30–32, 35–37, 46–48, 51
See application file for complete search history.

(56) References Cited

U.S. PATENT DOCUMENTS

| | | | |
|---|---|---|---|
| 3,389,533 A | 6/1968 | Tipper et al. | |
| 3,499,259 A | 3/1970 | Tipper et al. | |
| 4,683,700 A | 8/1987 | Evans et al. | |
| 4,766,713 A | 8/1988 | Evans | |
| 4,885,821 A | 12/1989 | Farkonas | |
| 4,924,552 A * | 5/1990 | Sullivan | 452/24 |
| 5,056,293 A | 10/1991 | Richards et al. | |
| 5,161,347 A | 11/1992 | May et al. | |
| 5,211,599 A | 5/1993 | Stanley | |
| 5,273,481 A * | 12/1993 | Sullivan | 452/24 |
| 5,495,701 A | 3/1996 | Poteat et al. | |
| 5,514,029 A | 5/1996 | Schutz | |
| 5,573,454 A | 11/1996 | Fox et al. | |
| 5,586,424 A | 12/1996 | Chen et al. | |

(Continued)

FOREIGN PATENT DOCUMENTS
WO WO2005/032759 4/2005

*Primary Examiner* — Thomas Price
(74) *Attorney, Agent, or Firm* — Myers Bigel Sibley & Sajovec, P.A.

(57) ABSTRACT

Methods, apparatus and associated devices for rucking sleeves of covering material onto a chute body include a translating member disposed in a housing having an axis of movement configured to reciprocally translate a chute body about the axis of movement; and at least one gripping member disposed in the housing in cooperating alignment with the translating member. Each at least one gripping member has a gripping edge portion that defines a gripping surface. The at least one gripping member configured to reciprocally translate substantially orthogonal to the axis of movement. In operation, the at least one gripping member has an automated stroke cycle whereby the at least one gripping member is configured to travel inwardly a distance sufficient to snugly abut an outer surface of the chute body while the chute body travels in a first direction about the axis of movement and to travel outwardly a sufficient distance to prevent contact with the chute body while the chute body travels in a second opposing direction about the axis of movement.

12 Claims, 18 Drawing Sheets

U.S. PATENT DOCUMENTS

| | | |
|---|---|---|
| 6,669,545 B1 | 12/2003 | Hergott et al. |
| 7,051,415 B2 * | 5/2006 | Pinto et al. ................ 29/455.1 |
| 7,441,386 B2 * | 10/2008 | Pinto et al. ................ 53/138.2 |
| 7,507,150 B2 | 3/2009 | Stall et al. |
| 7,537,514 B2 * | 5/2009 | Arias Lopez ................ 452/35 |
| 7,604,531 B2 | 10/2009 | Hanten |
| 7,647,749 B2 * | 1/2010 | Pinto et al. ................ 53/417 |
| 2005/0039419 A1 | 2/2005 | Griggs et al. |

* cited by examiner

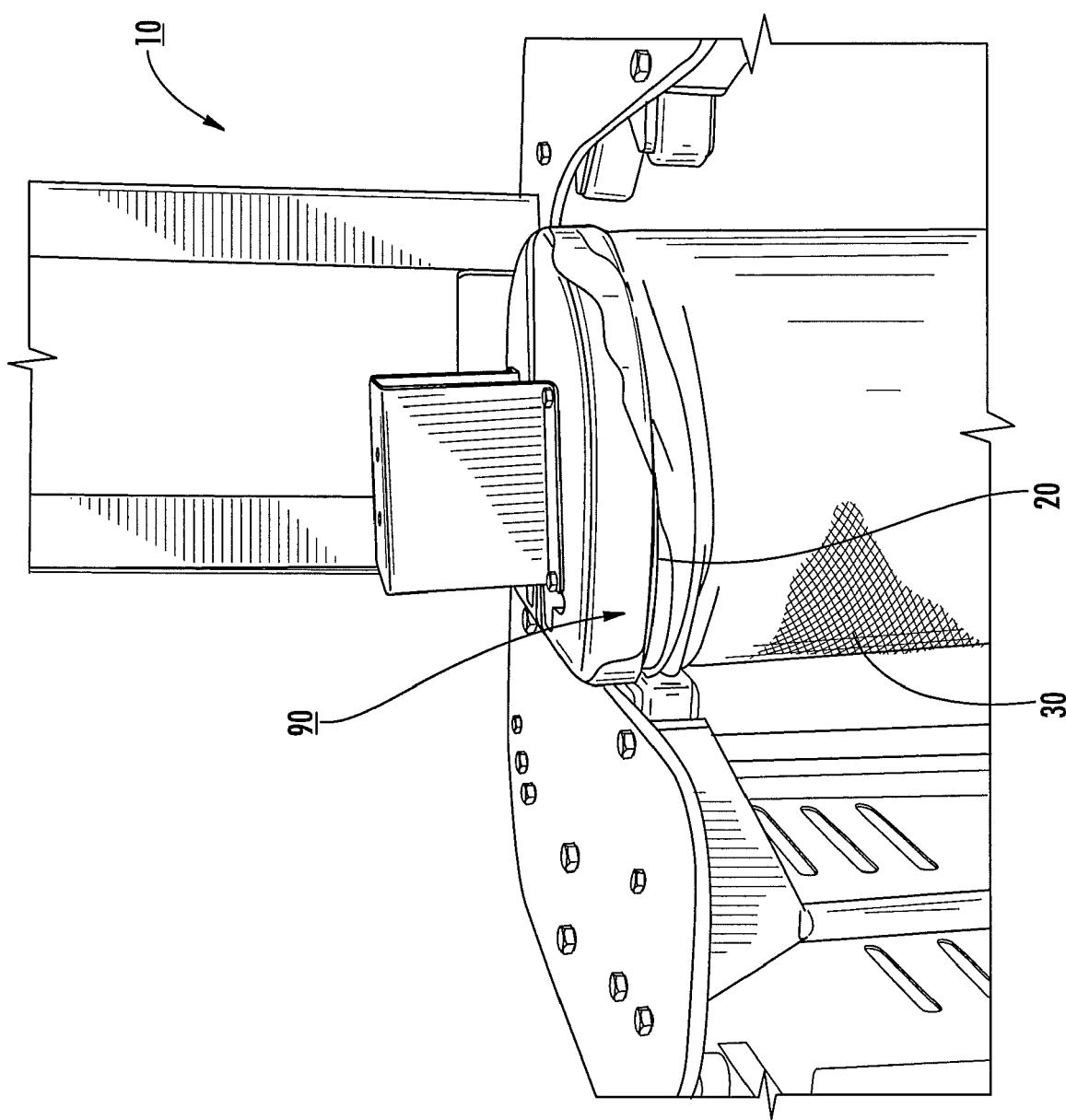

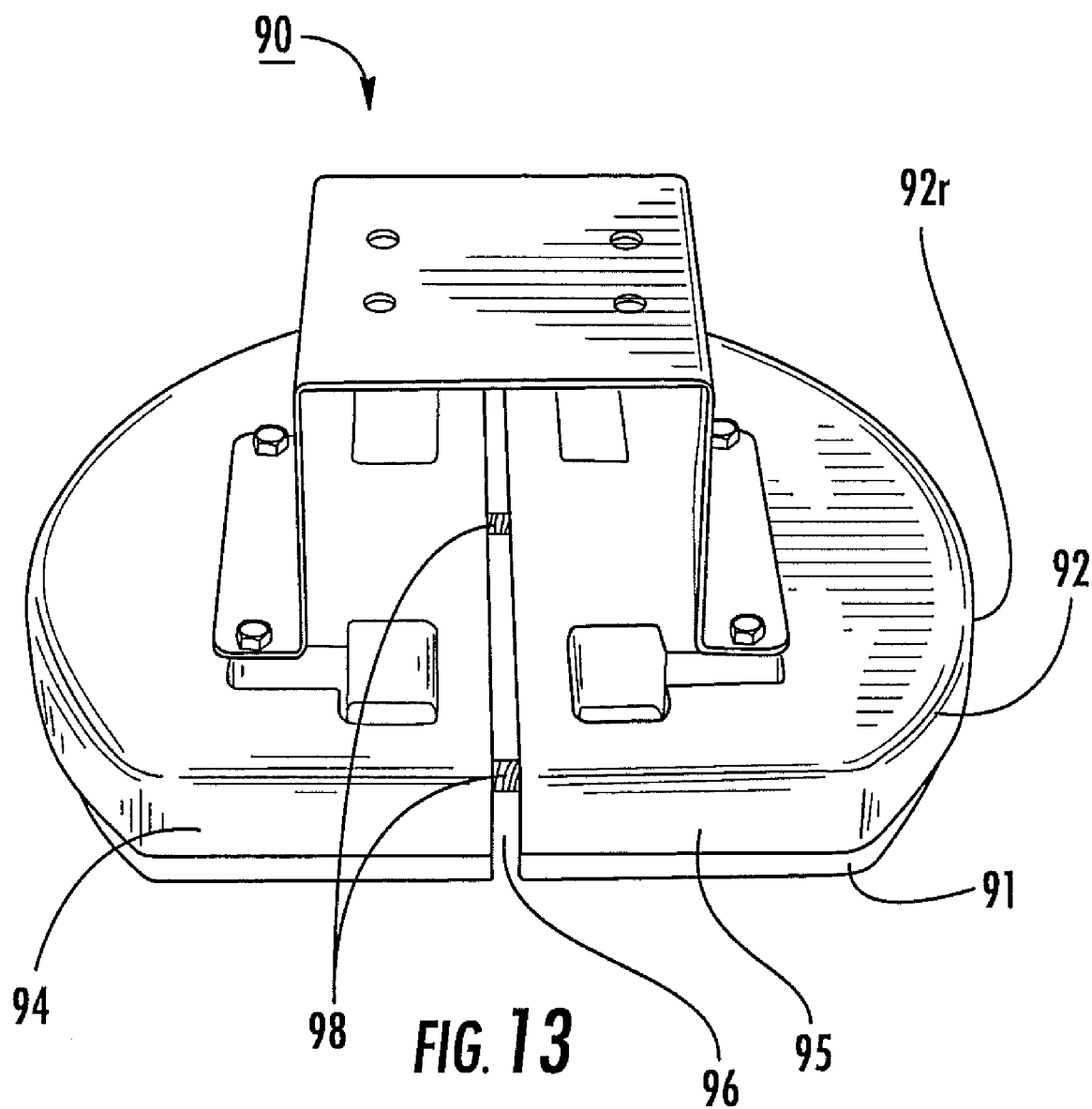

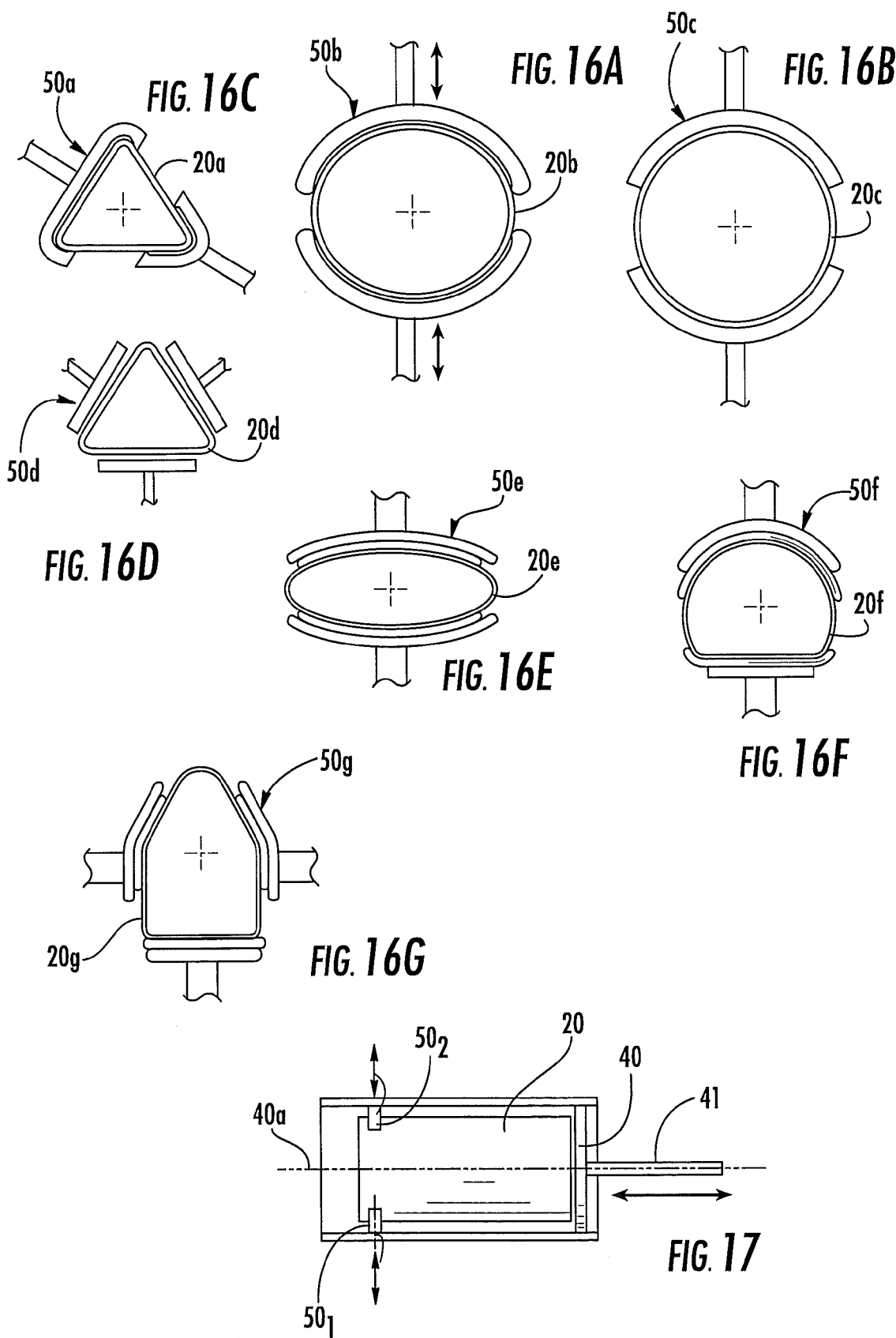

RUCKERS CAPABLE OF RUCKING FIXED DIAMETER COVERINGS AND ASSOCIATED DEVICES, METHODS, SYSTEMS AND COMPUTER PROGRAM PRODUCTS

RELATED APPLICATION

This application is a divisional of U.S. patent application Ser. No. 11/456,356, filed Jul. 10, 2006 now U.S. Pat. No. 7,704,129, which claims priority to U.S. Provisional Application Ser. No. 60/698,568, filed Jul. 12, 2005, the contents of which are hereby incorporated by reference as if recited in full herein.

FIELD OF THE INVENTION

The present invention relates to ruckers that can be used to load sleeves of material onto product chutes that, in operation, release the covering material to package products therein, and may be particularly suitable for fixed diameter covering materials.

BACKGROUND OF THE INVENTION

Certain types of commodity and/or industrial items can be packaged by placing the desired product(s) in a covering material and then applying a closure clip or clips to end portions of the covering material to secure the product(s) therein. For non-flowable piece goods, the piece goods can be held individually in a respective clipped package, or as a group of goods in a single package. The covering material can be any suitable material, typically a casing and/or netting material.

Generally described, when packaging a piece good product in netting, the product is manually pushed through a netting chute. The product can include, by way of example, a non-flowable semi-solid and/or solid object such as a meat product including whole or half hams, turkey, chicken, and the like. The netting chute holds a length of a netting sleeve over the exterior thereof. A first downstream end portion of the netting is typically closed using a first clip. As the product exits the netting chute, it is covered with the netting. An operator can then orient the product inside the netting between the discharge end of the chute and the clipped first end portion of the netting. The operator can then pull the netting so that the netting is held relatively tight (typically stretched or in tension) over the product. The operator then uses his/her hands to compress or gather the open end of the netting (upstream of the product) and then manually applies a clip to the netting, typically using a Tipper Tie® double clipper apparatus. A clip attachment apparatus or "clippers" are well known to those of skill in the art and include those available from Tipper Tie, Inc., of Apex, N.C., including product numbers Z3214, Z3202, and Z3200. Examples of clip attachment apparatus and/or packaging apparatus are described in U.S. Pat. Nos. 3,389,533; 3,499,259; 4,683,700; 5,161,347, and co-pending U.S. patent application Ser. No. 10/951,578 (Pub. No. US-2005-0039419-A1), the contents of these documents are hereby incorporated by reference as if recited in full herein.

The double clipper concurrently applies two clips to the netting proximate the open (upstream) end of the package. One clip defines the first end portion of the next package and the other defines the trailing or second end portion of the package then being closed. A cutting mechanism incorporated in the clipper apparatus can sever the two packages before the enclosed package is removed from the clipper apparatus. U.S. Pat. No. 4,766,713 describes a double clipper apparatus used to apply two clips to a casing covering. U.S. Pat. No. 5,495,701 proposes a clipper with a clip attachment mechanism configured to selectively fasten a single clip or two clips simultaneously. The mechanism has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. U.S. Pat. No. 5,586,424 proposes an apparatus for movement of U-shaped clips along a rail. The apparatus includes a clip feed for advancing clips on a guide rail and the arm is reciprocally driven by a piston and cylinder arrangement. The contents of each of these patents are hereby incorporated by reference as if recited in full herein.

To place a sleeve of the selected covering on the product chute, an automated or semi-automated rucker may be employed. This type of process is often described by those of skill in the art as "shirring" or "rucking" In the past, ruckers have been configured to reciprocate a netting tube or chute vertically to load the netting. Generally stated, the netting is stretched over the chute and stationary spring-loaded fingers circumferentially surround the tube and engage with openings in netting to pull segments of netting over the outer surface of the netting chute so that the netting covers a substantial portion of the length of the chute. In operation, the fingers flex from a normal horizontal orientation to contact the netting and carry the netting down during an upward stroke of the netting chute and slide over the netting during the downward stroke of the chute. An example of a prior art rucker that uses circumferentially mounted paddles that flex downward when the chute travels down to avoid the netting is described in U.S. Pat. No. 5,273,481, the contents of which are hereby incorporated by reference as if recited in full herein.

Unfortunately, conventional ruckers may not be suitable for shirring one or more of fixed diameter materials, delicate compression fit netting, or materials that may be susceptible to breaking and/or have less resilience than conventional elastic open weave netting types. In addition, conventional ruckers may not be suitably configured to operate with non-cylindrical product chutes.

SUMMARY OF EMBODIMENTS OF THE INVENTION

Some embodiments of the present invention provide ruckers that are capable of rucking fixed diameter covering materials, delicate and/or relatively inelastic covering materials, and/or ruckers that can accommodate non-circular profiles.

Some embodiments are directed to apparatus for rucking sleeves of covering material onto a chute body. The apparatus include: (a) a housing; (b) a translating member disposed in the housing having an axis of movement configured to reciprocally translate a chute body about the axis of movement; and (c) at least one gripping member disposed in the housing in cooperating alignment with the translating member. Each at least one gripping member has a gripping edge portion that defines a gripping surface. The at least one gripping member is configured to reciprocally translate generally orthogonal to the axis of movement. In operation, the at least one gripping member has an automated stroke cycle whereby the at least one gripping member is configured to travel inwardly a distance sufficient to snugly abut an outer surface of the chute body while the chute body travels in a first direction about the axis of movement and to travel outwardly a sufficient distance to prevent contact with the chute body while the chute body travels in a second opposing direction about the axis of movement.

Other embodiments are directed toward automated methods of rucking sleeves of covering material onto a product chute. The methods include: automatically reciprocally translating a product chute between a first direction and an opposing second direction about an axis of movement; and automatically reciprocally translating a plurality of gripping members substantially orthogonally to the axis of movement while the product chute is translating so that: (a) the gripping members abut the product chute while the product chute is traveling in the first direction; and (b) the gripping members are translating away from or are in a retracted configuration spaced apart from the product chute while the product chute is traveling in the second direction.

Other embodiments are directed toward computer program products for operating an automated rucking apparatus. The computer program product includes a computer readable storage medium having computer readable program code embodied in the medium. The computer-readable program code includes: (a) computer readable program code configured to direct the movement of a translating member to automatically reciprocally cause the product chute to move in opposing directions about an axis of movement with decreasing distance stroke cycles over a rucking operation; and (b) computer readable program code configured to direct a plurality of gripping members to automatically reciprocally move in a direction that is generally orthogonal to the axis of movement, with the movement of the gripping members being timed to cause the gripping members to snugly abut the product chute when the translating member is moving in the first direction and to cause the gripping members to move away from the product chute when the translating member is moving in the second direction.

Other embodiment are directed to loading caps for a rucker apparatus that include a pair of cooperating spring-loaded members attached to each other to be resiliently compressible side-to-side.

In some embodiments, the loading cap may have a non-circular perimeter shape. In other embodiments, the loading cap may have a generally or substantially circular profile. In particular embodiments, the pair of members may be configured as substantial mirror images of each other and define a loading cap with a generally arcuate profile portion that merges into a generally planar portion.

Other embodiments are directed to loading caps for a rucker apparatus that are sized and configured to extend a proximal distance above a first end of a product chute. The loading cap has a first internal portion that is sized and configured to reside a distance inside the product chute and a second external portion overlying the first portion with an increased cross-sectional area sufficient to cause the outer edge portions thereof to reside outside the bounds of the first end of the product chute. The second portion of the loading cap has rounded outer edges that contact and guide covering material being pulled over the chute to thereby inhibit contact with the first end of the product chute.

These and other objects and/or aspects of the present invention are explained in detail in the specification set forth below.

BRIEF DESCRIPTION OF THE DRAWINGS

FIG. 12 is a front perspective view of an upper portion of the nicker shown in FIG. 6, with a chute and a loading cap assembly in position according to embodiments of the present invention.

FIG. 13 is a front perspective view of a loading cap assembly according to embodiments of the present invention.

FIGS. 16A-16G are schematic illustrations of exemplary alternative gripping member configurations and alternative chute profile configurations according to embodiments of the present invention.

FIG. 17 is schematic illustration of an alternative translation orientation according to embodiments of the present invention.

DESCRIPTION OF EMBODIMENTS OF THE INVENTION

Figure 1:
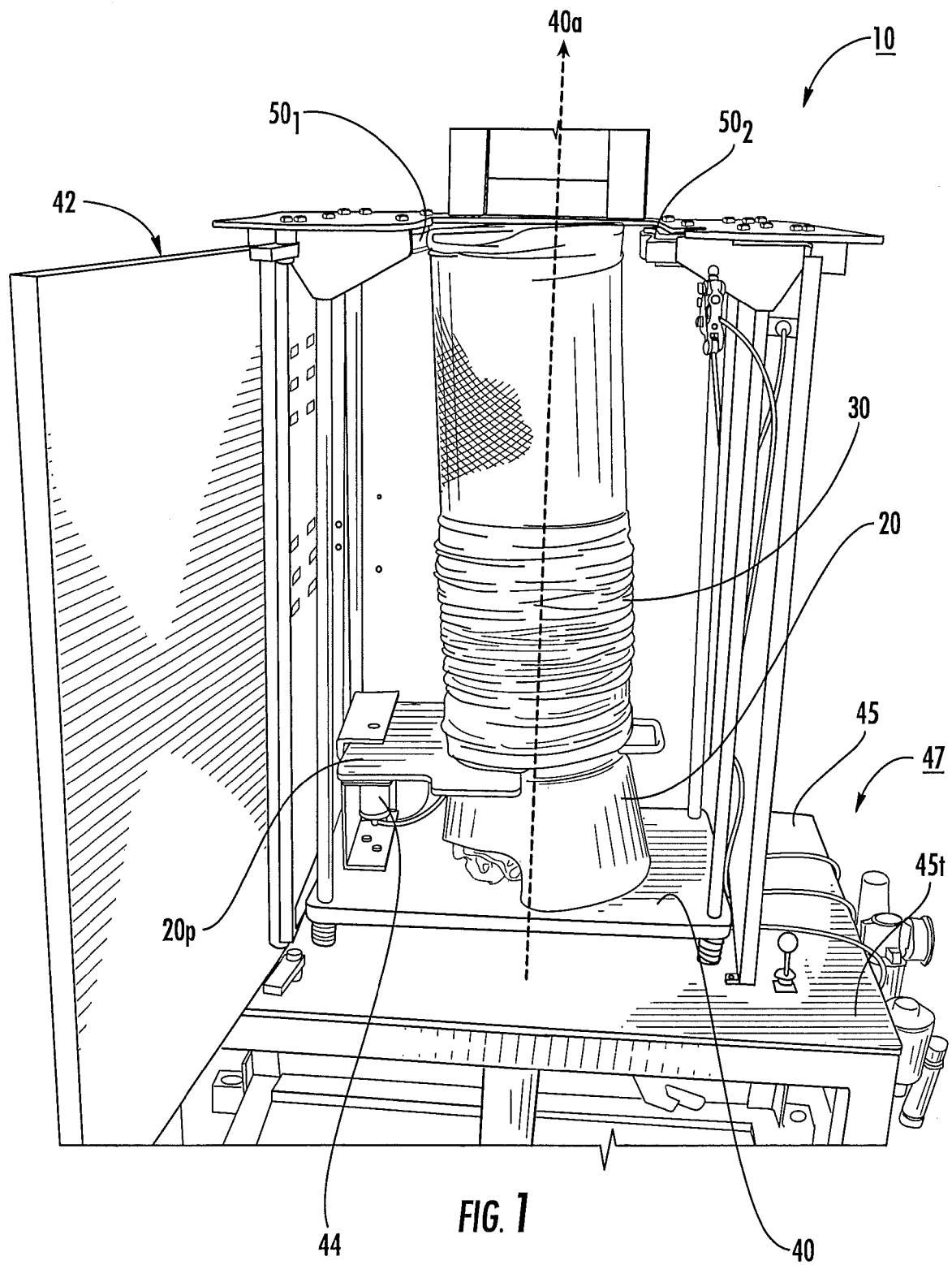
FIG. 1 is a front view of a portion of a rucker according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the term "front" or "forward" and derivatives thereof refer to the general or primary direction that the clips travel toward a target product for closure and/or the direction that the target filled or stuffed product in casing material travel; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "automated" and "automatic" refers to operations that are carried out without requiring manual assistance and are typically carried out using electronic controls and programmatic direction. The terms also contemplate the use of manual activation of the automatic operations. The term "iteratively" means to generally successively adjust (typically decrease) the stroke distance of the translating member after each stroke or a number of successive strokes. The term "frame" means a generally skeletal structure used to support one or more assemblies, modules and/or components. The term "modular" means that a subassembly is designed with standardized dimensions, mounting features and/or configurations for interchangeable use with replacement modules of the same or similar type and/or other selected different modules.

The present invention is particularly suitable for providing covering materials that may employ closure clips to enclose discrete objects in the covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. The term "netting" refers to any open mesh material formed by any means including, for example, knotted, braided, extruded, stamped, knitted, woven or otherwise. Typically, the netting is configured so as to be stretchable in both axial and lateral directions, but fixed diameter netting or covering may also be used. In some embodiments, the covering material is a fixed diameter or compression netting material (known as "fixed diameter net") comprising cotton, available from Jif Pak (Vista, Calif.) and PCM (Greenville, S.C.). In some embodiments, the covering material is substantially non-elastic or frangible when laterally stretched more than 10%, and typically cannot be stretched, without unacceptable degradation, more than 5% beyond the bounds of the underlying target chute. In some embodiments, the covering can be a generally closed weave delicate and/or relatively inelastic material (at least in the non-axial dimension).

Netting or other covering material may be used to package discrete meat products such as loaves of meat, boned ham, spiral sliced ham, deboned ham, turkey, turkey loaves held in molds, or other meat or items, directly or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like. Examples of non-food items that may be packaged using embodiments of the present invention include living items such as flora, trees, and the like, as well as inanimate objects. Additional examples of products include discrete, semi-solid or solid non-flowable objects such as firewood, pet food (typically held in a container if the wet type), recreational objects (such as toy or game balls), or other solid or semi-solid objects. The product may be packaged for any suitable industry including horticulture, aquaculture, agriculture, or other food industry, environmental, chemical, explosive, or other application. Netting may, be particularly useful to package ham or turkeys, manufactured hardware such as automotive parts, firewood, explosives, molded products, and other industrial, consumable, and/or commodity item(s).

Embodiments of the present invention may be particularly suitable for operating with delicate substantially inelastic (at least in the radial direction) netting, such as cotton fiber fixed diameter coverings that may be configured to hold large meat products, such as meat products weighing over 20 pounds, typically about 35-40 pounds. In some embodiments, the sleeves of covering placed on the product chute can be greater than or equal to about 120 feet in length and sufficient to enclose between about 50-80 discrete hams, and typically about 60 discrete hams.

In some embodiments, the covering is a closed weave material comprising cotton that is used to control the size of ham steaks to provide consistency in steak size, ham to ham. The tight weave of the covering is such that there is very little stretch (i.e., fixed diameter) such that the cross-sectional size (when stretched) is very close to that of the chute.

Generally stated, embodiments of the present invention are directed at automating the rucking of covering materials onto chutes that are used to package piece goods or discrete items by forcing the goods through a product chute and wrapping or enveloping the objects at the other end of the product chute in a covering material, such as netting as one or more of the goods exit the chute. In some embodiments, after the product(s) is enclosed in the packaging, a clip(s) or other attachment means can be automatically or semi-automatically applied to the covering material to thereby close a leading and/or trailing edge of the covering and hold the object or objects inside of the covering material. As noted above, clippers are available from Tipper Tie, Inc., of Apex, N.C. Examples of suitable clips include metallic generally "U"-shaped clips available from Tipper Tie, Inc., in Apex, N.C. Other clips, clip materials and clip configurations or closure means may also be used.

Referring now to FIG. 1, an exemplary rucker apparatus 10 is shown. The rucker 10 includes a translating member 40, typically a translating platform 40 as shown, configured to reciprocally translate a chute 20 about an axis of movement 40a and two spaced apart cooperating members $50_1$, $50_2$ configured to reciprocally translate inward and outward, typically generally orthogonal to the axis of movement to thereby pull lengths of covering 30 over a length of the chute 20. The translating member 40 can be a bracket or other suitable mechanism that is able to controllably translate the chute during operation. In addition, although shown as two generally opposing cooperating gripping members $50_1$, $50_2$, more or lesser numbers of gripping members may be used. In the embodiment shown, the chute 20 includes a mounting plate 20p that engages an air-actuated locking member 44 to help secure the chute 20 in position so that the lower portion of the chute travels with (and resides against) the mounting platform 40.

As shown, the rucker 10 can include a housing 42 that sits on a table 45 having a height sufficient to allow a translating actuator and cylinder 41 (FIGS. 2A, 3A, 4A) (such as a piston) to retract under the table top 45t placing the translating member 40 in its resting, loading, retracted or home position. The housing 42 is typically stationary and the gripping members can be generally fixed at an upper location of the housing at a desired position along to the axis of movement 40a while the chute 20 and translating member typically reciprocally move about the axis of movement 40a.

Figure 5:
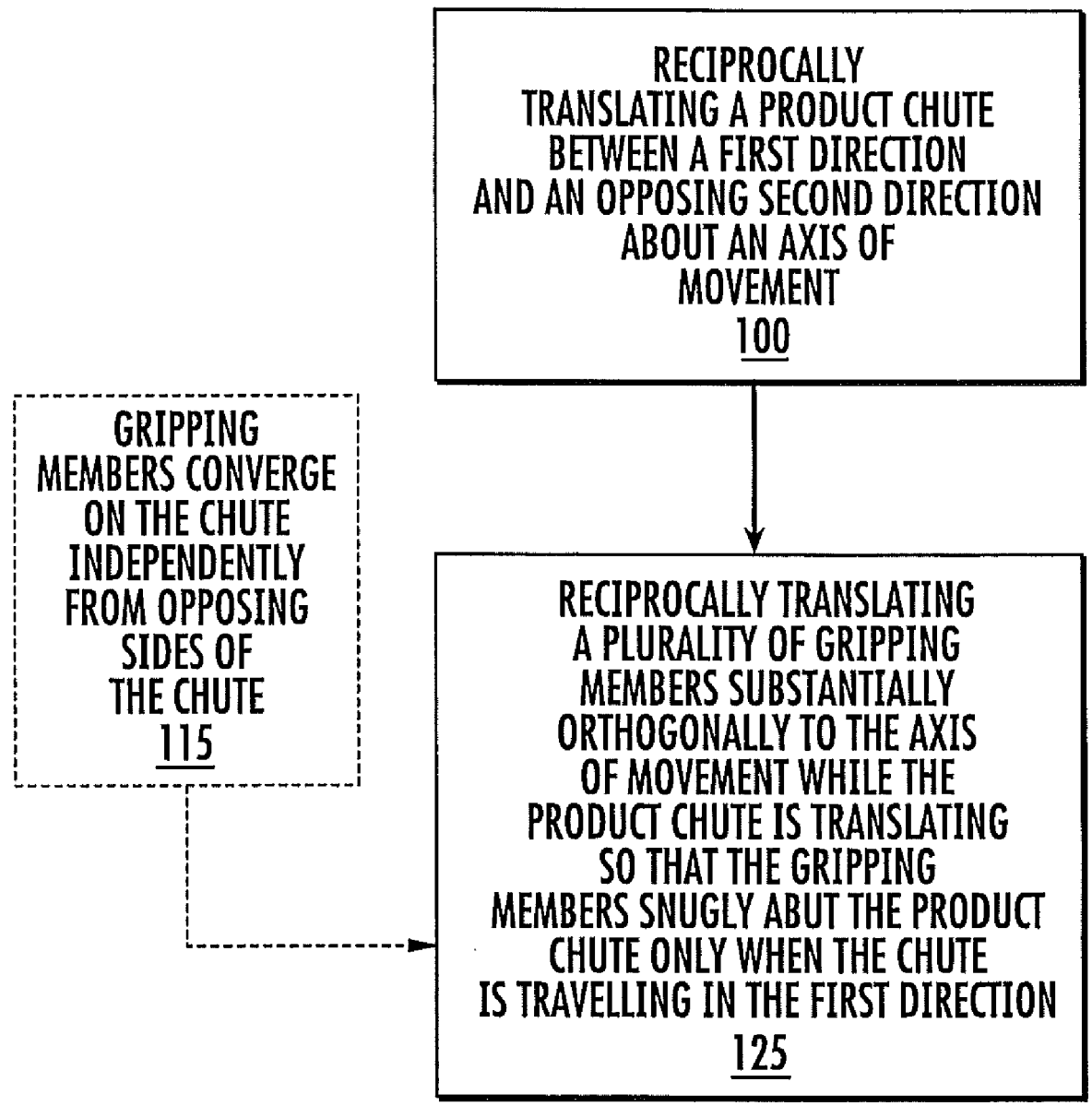
FIG. 5 is a flow chart of operations that can be used to carry out methods of rucking covering materials onto a chute according to embodiments of the present invention.

FIG. 5 illustrates operations that can be used to carry out embodiments of the present invention. As shown, the product chute can be reciprocally translated between a first direction and an opposing second direction about the axis of movement (block 100). The plurality of gripping members can be reciprocally translated generally, and typically, substantially, orthogonally to the axis of movement while the product chute is translating so that the gripping members snugly abut against the product chute only when the chute is traveling in the first direction (block 125). In some embodiments, the gripping members can converge on the chute independently from opposing sides of the chute (block 115).

Figure 2A:
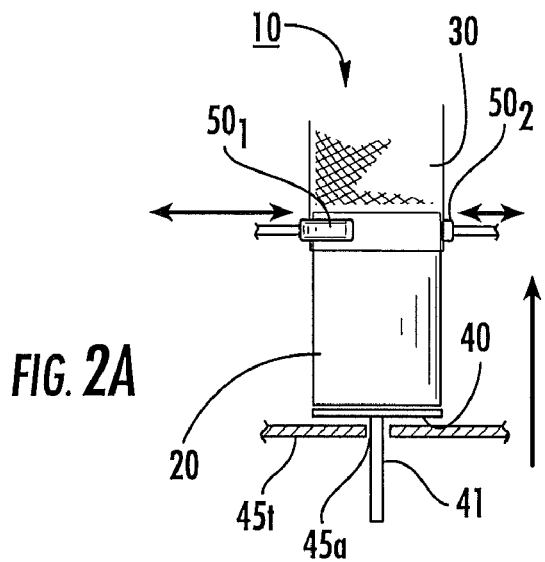
FIGS. 2A, 3A and 4A are schematic front view illustrations of serial rucker operations according to embodiments of the present invention.
Figure 2B:
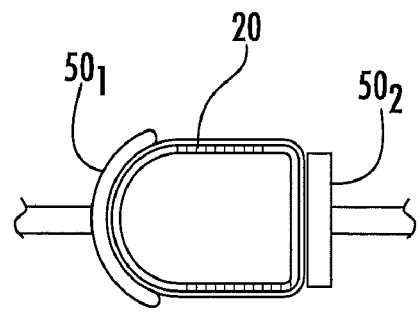
FIGS. 2B, 3B and 4B are schematic top view illustrations of the rucker showing the gripper members in position relative to the chute, in the operations of FIGS. 2A, 3A, and 4A, respectively, according to embodiments of the present invention.
Figure 3A:
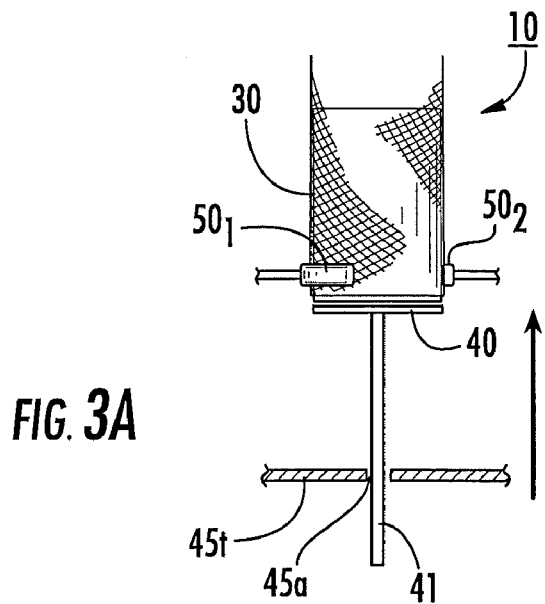
Figure 3B:
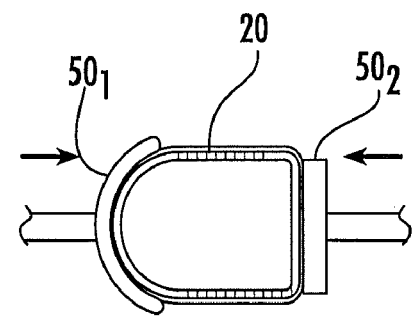
Figure 4A:
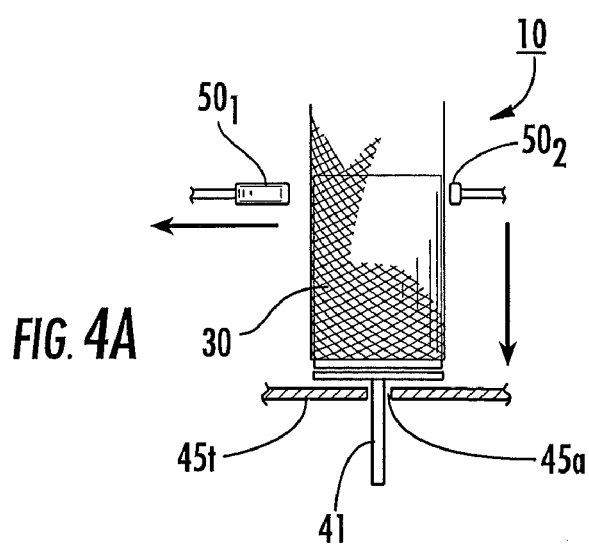
Figure 4B:
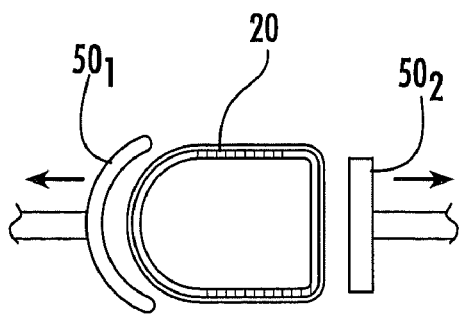

As shown by the exemplary operations in FIGS. 2A-4A, in operation, the gripping members $50_1$, $50_2$ contact the chute 20 with a certain pressure as the chute 20 is translated upward (FIGS. 2A, 2B). The gripping members $50_1$, $50_2$ press the covering material 30 against the outer wall of the chute 20 and pull the covering material 30 down (FIGS. 3A, 3B). When the chute 20 reaches a desired upward position (associated with a travel distance) along the axis of movement, the gripping members $50_1$, $50_2$ release the covering material 30 while the chute travels downward (FIGS. 4A, 4B). The rucker 10 may also be configured to operate in the reverse so that the gripper members $50_1$, $50_2$ contact the chute as the chute travels downward to pull the covering material 30 and release the chute 20 when it is moving upward. Combinations of the above may also be used. In addition, other axis of movements can also be used, such as horizontal or angular.

In other embodiments, the chute 20 may be held generally stationary with the gripping members 50 configured to translate along the axis of movement as well as generally orthogonal thereto.

In any event, the translation along the axis of movement 40a (typically the chute) can have different stroke lengths so as to distribute lengths of the covering over a desired length of the chute. Typically, the first stroke is the longest and the last is the shortest. The translating member 40 can be configured so that the chute 20 may also stall a short time after it reaches an extended position(s). The chute 20 may be configured to travel the same distance several times to pull bunches of covering over a localized region of the chute before distributing covering to an upstream location on the chute 20. The translating member actuator 41 can be configured to travel decreasing stroke lengths whereby the chute 20 and platform 40 are translated at iteratively lesser distances to pull covering material over different portions of the chute body.

As shown in FIGS. 2A, 3A and 4A, the table top 45t can include an aperture 45a that allows a fluid actuated cylinder 41 mounted under the table top 45t to automatically move the translating member 40 through its operative stroke cycle (reciprocally from extended and retracted positions). In other embodiments, the rucker actuation cylinder 41 may reside in a pit to allow the chute 20 to load into the rucker at floor level (not shown). In still other embodiments, the tucker 10 may be oriented to load the chute 20 while the chute is held generally horizontally (FIG. 17) or angularly (not shown).

Figure 6:
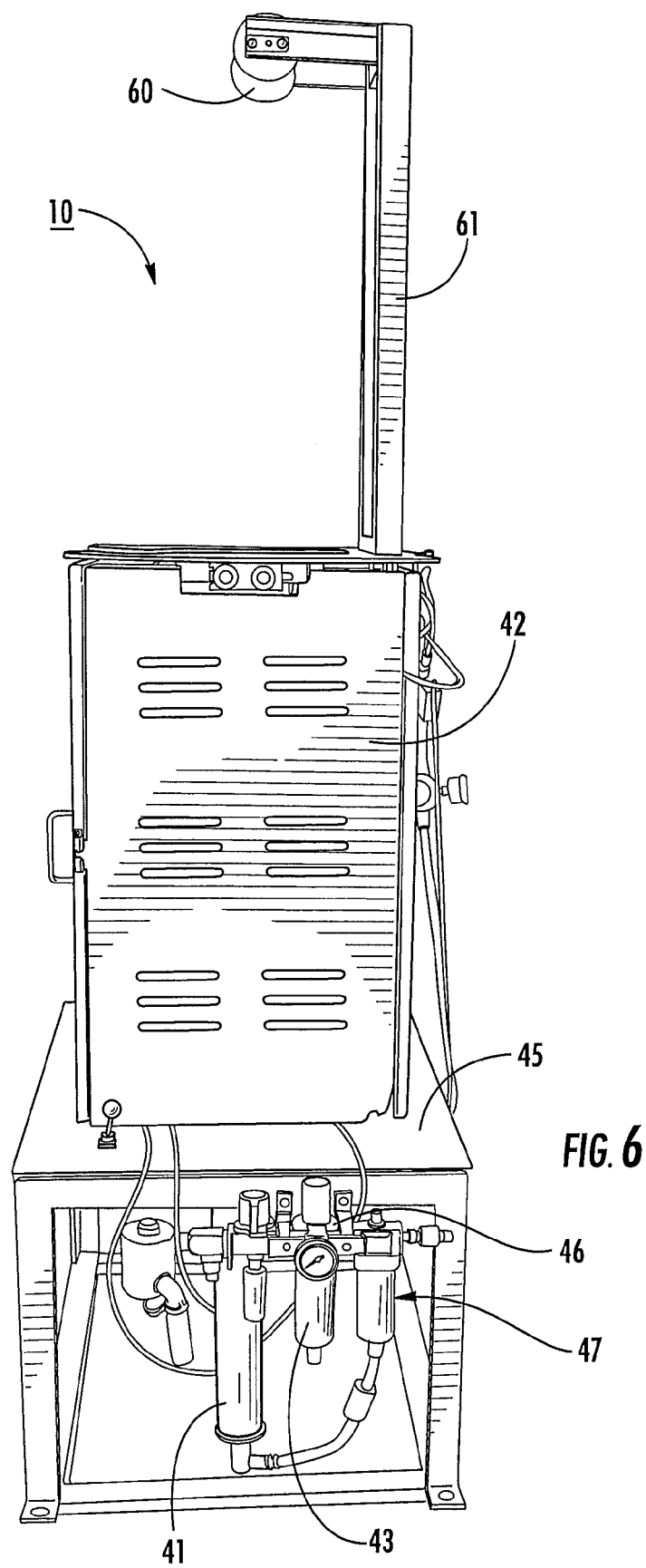
FIG. 6 is a side perspective view of a rucker with a housing enclosing certain features according to embodiments of the present invention.

FIG. 6 illustrates that the rucker can include a pressure distribution and regulation system 47 that have fluid lines that connect to actuators to automatically actuate the gripping members $50_1$, $50_2$, the locking member 44 (FIG. 1) and/or the translating member 40. The actuators can be air actuators and the gripping members $50_1$, $50_2$ can include at least one regulator 46 that controls the pressure that the gripping members $50_1$, $50_2$ apply to the chute body 20 as well as stroke length, speed and the like to distribute the covering material 30. The translating member 40 can include a separate regulator 43 to control its operating pressure. In some embodiments, the regulator 46 can be configured to provide between about 30-80 psi, and typically between about 40-60 psi of gripping member $50_1$, $50_2$ pressure to the chute 20. The translating member regulator 43 can be configured to provide between 60-100 psi, and typically between about 80-90 psi, to the translating member 40 (to translate the chute 20) during operation. The translating member actuator (and/or gripper member actuator(s)) can be an adjustable variable speed actuator.

Figure 7:
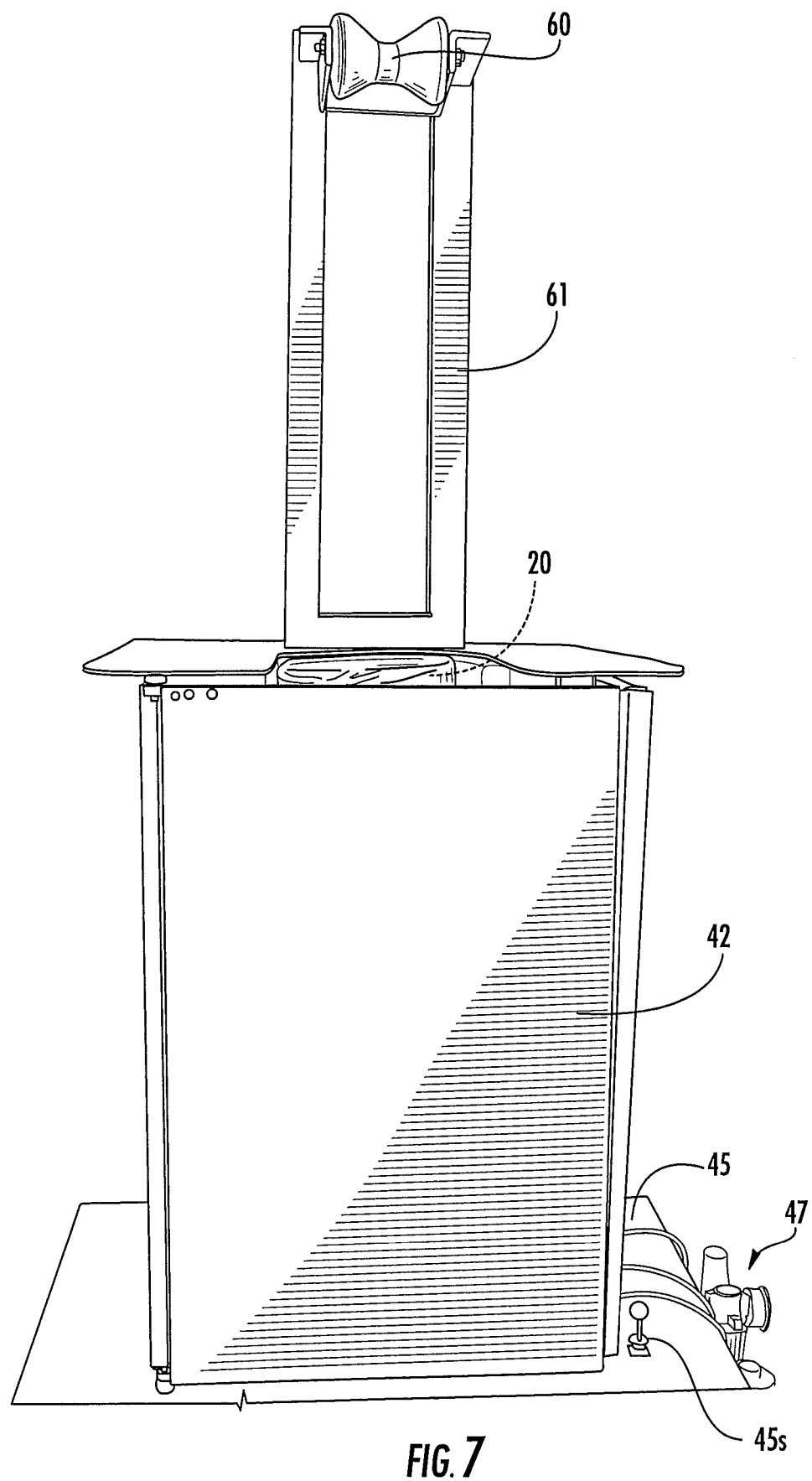
FIG. 7 is a different side perspective view of the nicker shown in FIG. 6.

FIGS. 6 and 7 also illustrate that the rucker 10 can include a stop member 60 held by a bracket 61 at a height that is at the maximum distance traveled by the chute 20. In other embodiments, the stop member 60 may be configured to slide (incrementally down) as the stroke distance of the chute reduces during a shining operation. As shown the stop member 60 can include a roller.

The rucker 10 can be configured to inhibit operation until the chute 20 is in proper position and the access door of the housing 42 closed. An operator switch 45s can be used to initiate operation. In other embodiments, the rucker 10 can be configured to automatically initiate operation when the chute 20 is loaded (which can be automatically electronically confirmed using a proximity sensor and/or other position sensor and/or when the air lock 44 is engaged) and the door closed.

Figure 8:
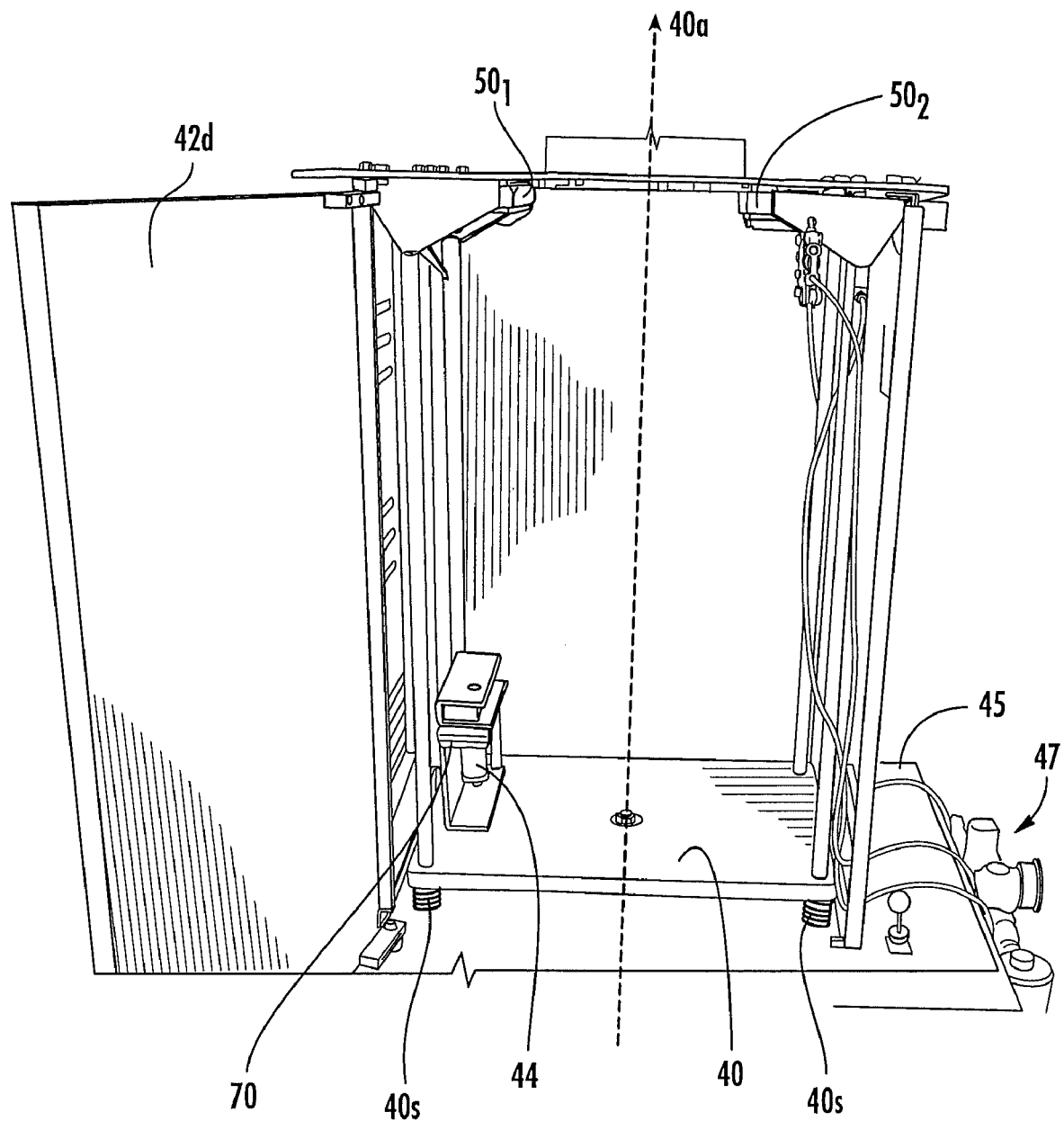
FIG. 8 is a front perspective view of a portion of the rucker shown in FIG. 6, with an access door or panel open, illustrating an interior view prior to a chute being loaded therein according to embodiments of the present invention.

FIG. 8 illustrates the rucker 10 with an access door 42*d* open and ready for loading a chute. The translating member 40 (shown as the platform) can be in communication with coil springs 40*s* or other shock absorbing or resilient mounting means to facilitate reciprocal movement of the chute and/or inhibit wear on the system. Examples of other resilient means include, leaf springs, elastomer grommets, and pistons.

Figure 9:
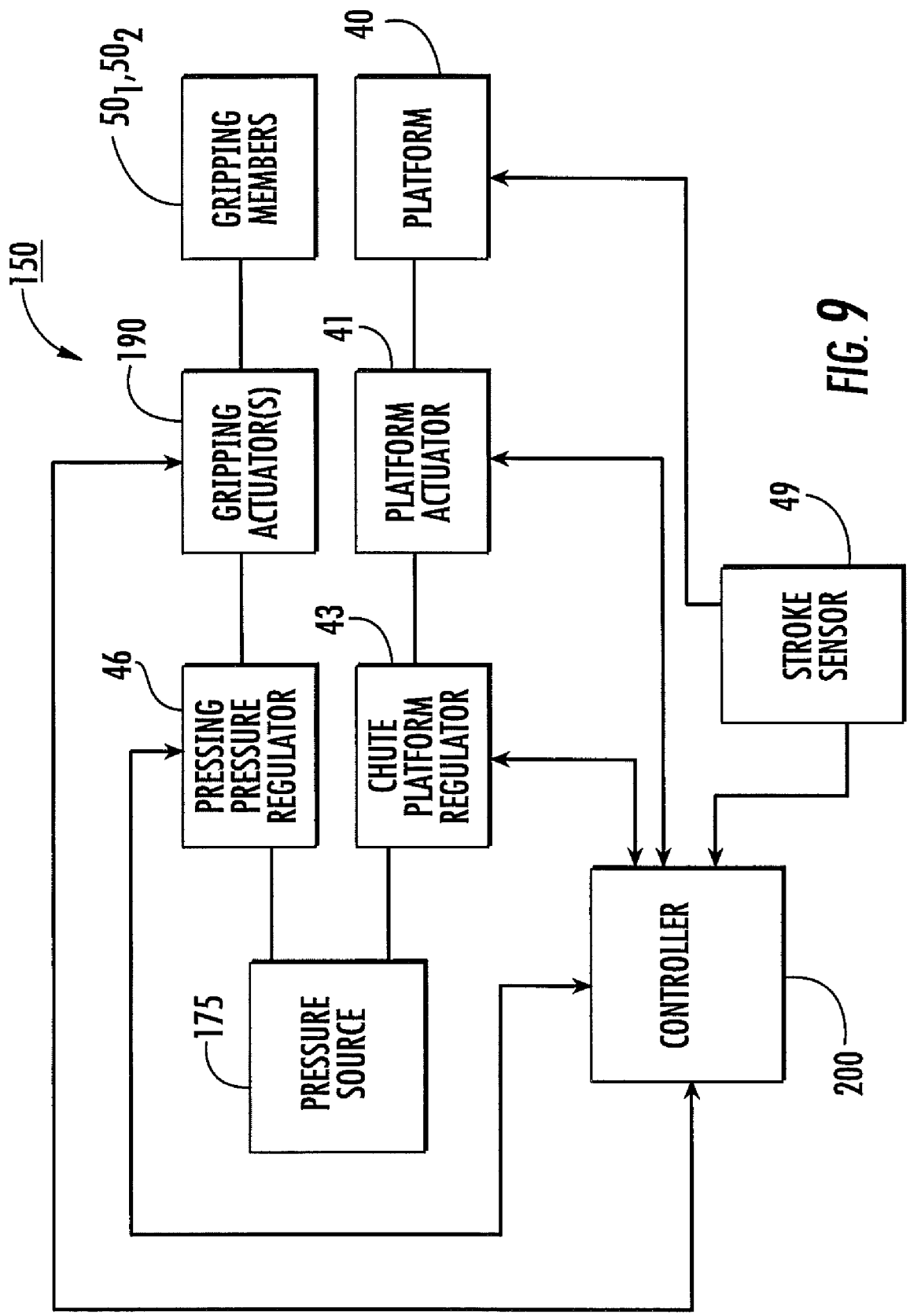
FIG. 9 is a schematic diagram of an automated or semi-automated rucker according to embodiments of the present invention.

FIG. 9 illustrates an exemplary control/operational diagram 150 according to embodiments of the present invention. As shown, a controller 200 can communicate with the gripper members $50_1$, $50_2$ and the translating member 40. The controller 200 can be configured to control the desired reciprocal translation speed and stroke distances of the gripping members $50_1$, $50_2$ (together or independently) and the translating member 40 as well as the timing of operation to synchronize the operations. The controller 200 can be configured to control the actuation of the gripping member actuator(s) 190 and the translating member actuator 41. In some embodiments, a stroke (chute/translating member) position sensor 49 can be configured (typically at a bottom portion of the housing proximate the lowest position of the chute during the stroke cycle) to provide feedback to the controller 200. In other embodiments, a common pressure regulator can be used and different pressure regulation control means may be configured to apply the desired pressure to the gripping members $50_1$, $50_2$ (together or independently) and the translating member 40.

In some embodiments, one gripper member $50_1$, $50_2$ may converge (and/or move away) to contact the chute body 20 before the other. In other embodiments, the gripper members $50_1$, $50_2$ may be configured to converge (and/or move away) substantially concurrently.

The gripping members $50_1$, $50_2$ may be configured to operate based on a single actuator or multiple actuators. When using a single actuator, a linking mechanism can be used to force the gripping members against the body using the single actuator (not shown). In some embodiments, each gripping member or pairs of gripping members or combinations thereof (where more than two gripping members are used) may be configured to operate with a respective actuator $190_1$, $190_2$ (FIG. 10C) that can be controlled by the controller 200.

As shown in FIG. 1, in some embodiments, during loading, the chute 20 may lean (axially away from the direction of movement) as the chute rises from the mounting bracket 44 until the gripper members $50_1$, $50_2$ both close against the body of the chute. During operation, when the chute 20 travels upward without the gripper members engaged, the chute 20 may lean to be slightly misaligned with the axis of movement. However, as the gripping members contact the chute 20 and pull the covering material thereon, the chute 20 is typically held substantially axially aligned with the axis of movement 40*a*.

Figure 10A:
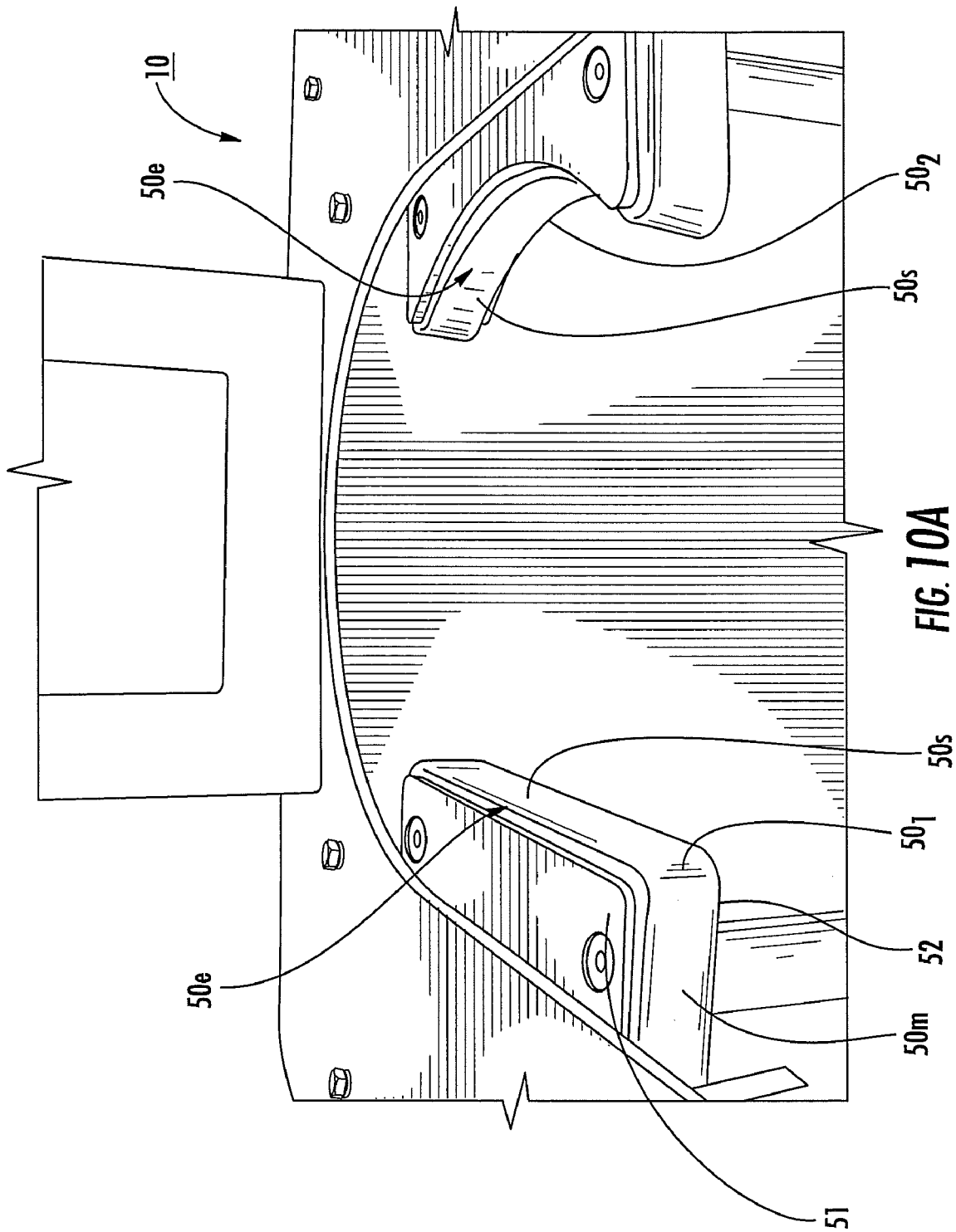
FIG. 10A is an enlarged perspective view of an upper portion of the rucker shown in FIG. 6, illustrating the gripping members in an extended configuration according to embodiments of the present invention.
Figure 10B:
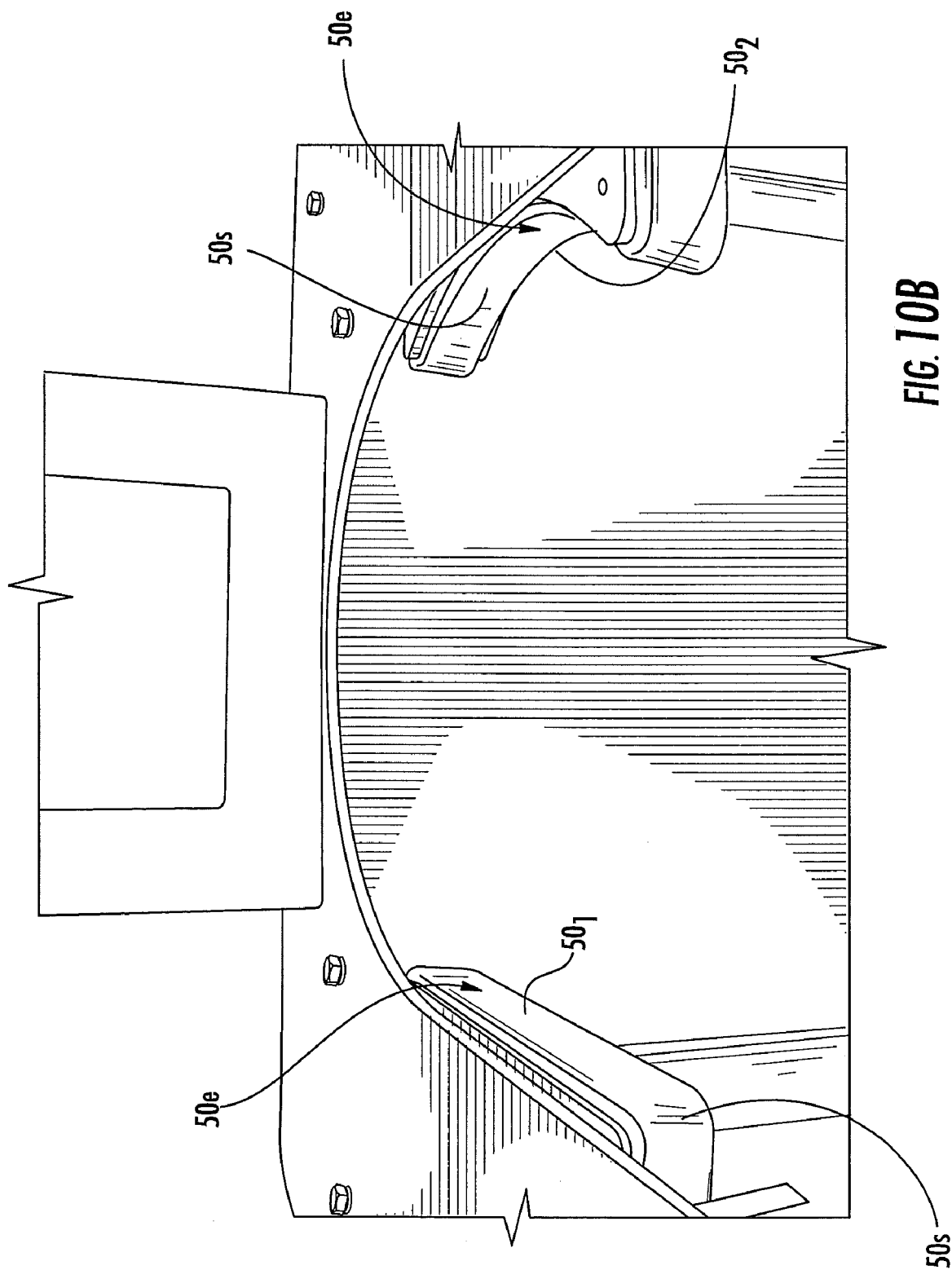
FIG. 10B is an enlarged perspective view of an upper portion of the rucker shown in FIG. 10A, illustrated with the gripping members in a retracted configuration according to embodiments of the present invention.

FIG. 10A illustrates the gripping members $50_1$, $50_2$ in an exemplary extended configuration while FIG. 10B illustrates them in an exemplary retracted configuration (with the chute not shown). The stroke distance and/or gripping pressure of the gripping members $50_1$, $50_2$ can be adjusted to accommodate different size chutes (and/or type of covering material). The gripping member actuator(s) 190 (FIG. 10C) can be configured to operate and accept differently configured gripping members thereby providing replaceable gripping-member modular assemblies. The gripping members 50 can be configured so that they do not use the full range of their stroke length to contact the chute body. The modular configuration of the gripper members can allow the rucker 10 to accommodate different size and/or shape chutes 20 with minimal set-up time. The controller 200 can be configured (typically at an OEM site, but can be field upgraded) with different running program modules (which may vary speed, stroke distance, gripping pressure, timing and the like) depending on the running configuration of the chute and/or gripping members and/or covering material.

FIGS. 10A and 10B also illustrate that the gripping members $50_1$, $50_2$ have a gripping edge portion 50*e* with a gripping surface 50*s*. In the embodiment shown, a first gripping member $50_1$ has a generally planar gripping surface profile while the second gripping member $50_2$ has a curvilinear (typically semi-arcuate) profile. The gripping surface 50*s* can be provided as replaceable pads of gripping material having sufficient frictional properties to allow suitable gripping without being unduly abrasive to the target covering. In some embodiments, the gripping surface comprises a urethane material. As shown in FIG. 10A, the gripping material 50*m* is sandwiched between two metal plates 51, 52. In other embodiments, the gripping material 50*m* may be provided as a coating and/or spacer on an outer edge of a supporting member. Other gripping surfaces, configurations, and materials may be used.

The gripping edge portion 50*e* can be structurally sufficiently rigid and mounted to substantially retain its shape and orientation during operation (both when contacting the chute and when not in contact with the chute). The gripping edge portion 50*e* and corresponding gripping surface 50*s* can have a substantially constant shape and orientation that is substantially inflexible in the direction of the axis of movement.

The gripping member configuration typically employs less than four spaced apart gripping members disposed at a common (typically fixed) axial location about the axis of movement.

As shown in FIGS. 2B-4B, the gripping members $50_1$, $50_2$ can be configured so that their respective gripping edge portions 50*e* (and contact surfaces 50*s*) (FIG. 10A) cumulatively extend over at least about 25%, typically at least about 30%, and more typically between about 40-60%. In some embodiments, the edge portions are configured so that cumulatively they occupy less than about 80%, typically less than about 70% of a perimeter line drawn about a cross sectional outer surface of the chute body at the axial location of the gripping members $50_2$, $50_2$.

The gripping member configuration can be such that the respective gripping surfaces of each member 50 each occupies at least about 10% of the perimeter cross-sectional distance of the chute and so that, cumulatively, the gripping members occupy less than about 70% of the perimeter cross-sectional distance.

In some embodiments, the gripping members comprise four or less gripping members with gripping surfaces that combined provide a profile that is generally conformal to at least about 40% (and typically less than 80%) of a cross-sectional perimeter shape of the chute and the cross-sectional shape can be non-circular. In other embodiments, the shape may be generally or substantially circular.

FIGS. 10A and 10B show that the gripping members $50_1$, $50_2$ can be cooperating gripping members that are spaced apart and disposed generally opposing each other across the axis of movement. As discussed above, the cooperating pair of gripping members may travel through their respective automated stroke cycles substantially in concert with each other.

Figure 10C:
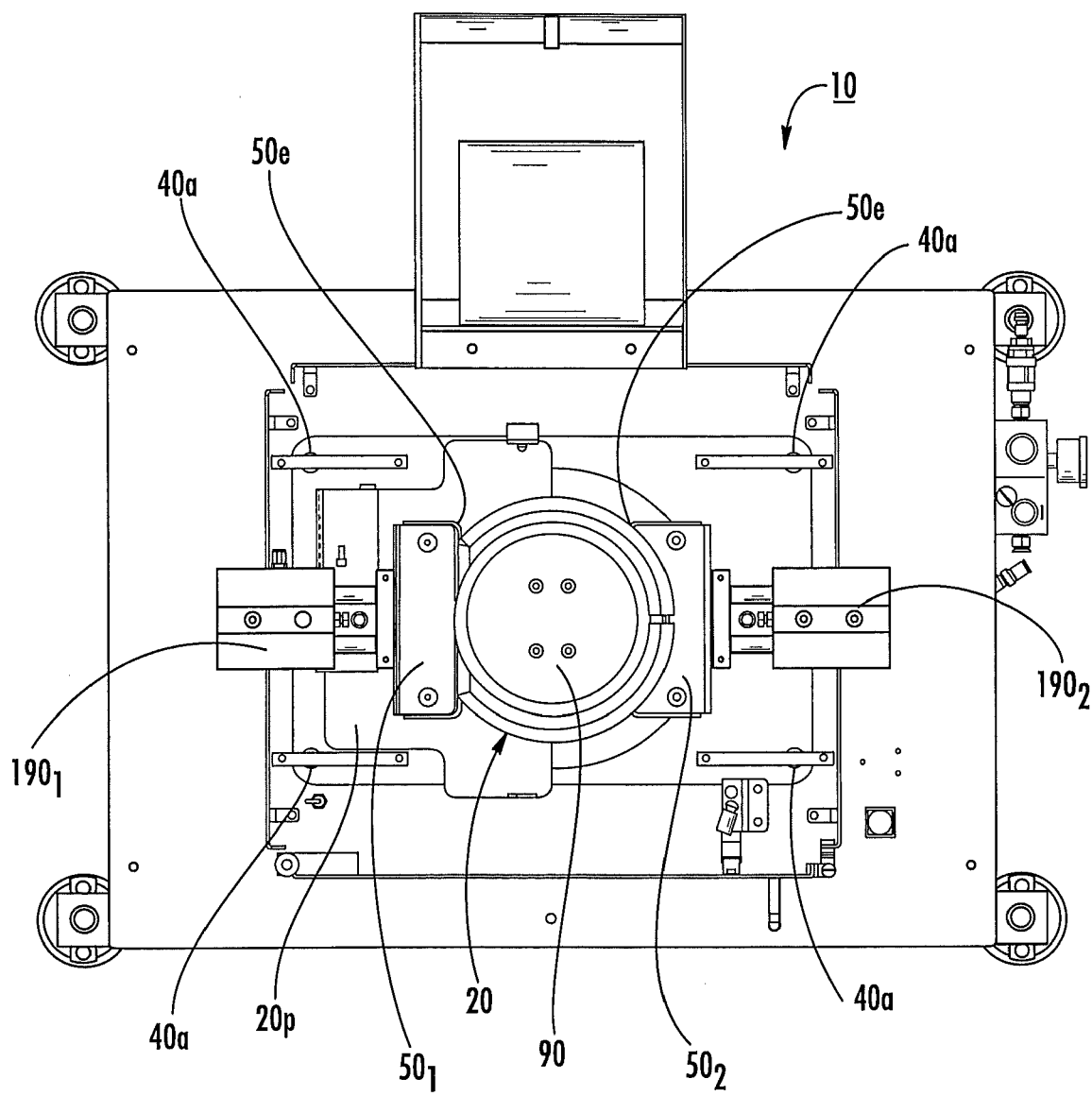
FIG. 10C is a top view of the rucker illustrating two gripper members residing against opposing sides of a product (netting) chute and associated respective actuators according to embodiments of the present invention.

FIG. 10C is a top view of an exemplary gripping member configuration. As shown, each gripping member $50_1$, $50_2$ is in communication with a respective actuator $190_1$, $190_2$. The gripping member actuators $190_1$, $190_2$ can comprise a twin bore cylinder configuration to inhibit the gripping members $50_1$, $50_2$ from pivoting as they contact the chute 20 during operation thereby stabilizing a desired contact orientation. The stabilized orientation allows for the gripper members $50_1$, $50_2$ to substantially conform to the cross-sectional shape of the chute as shown.

Figure 11A:
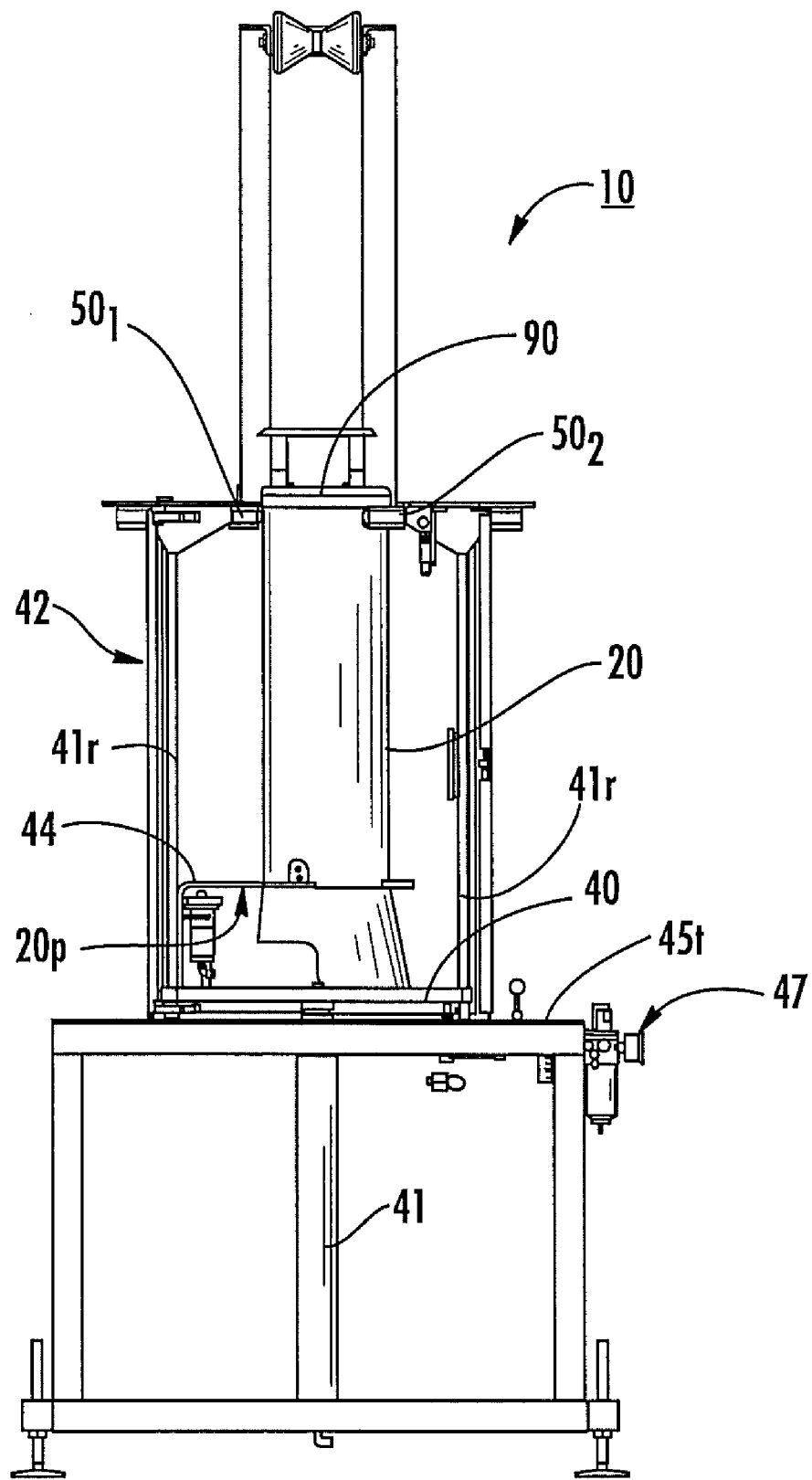
FIG. 11A is a side view of the rucker with a chute in position at a lower operative position according to embodiments of the present invention.
Figure 11B:
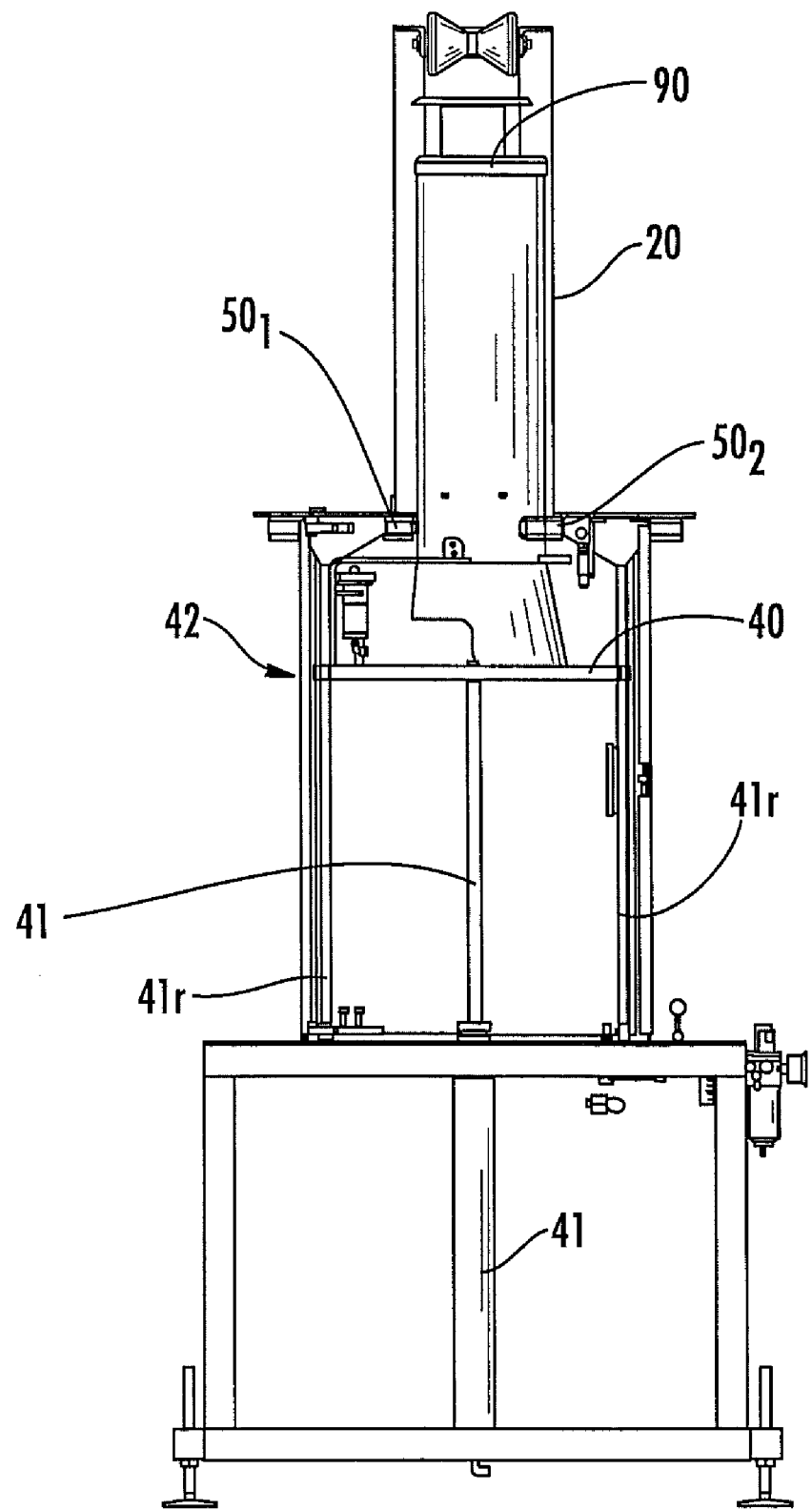
FIG. 11B is a side view of the nicker shown in FIG. 11A, but illustrating the chute in an upper operative position according to embodiments of the present invention.

FIGS. 11A and 11B illustrate the chute 20 in the rucker 10 with the door 42d of the device removed for clarity. FIG. 11A illustrates the chute 20 in a typical lowermost (load) position. FIG. 11B illustrates the chute 20 in an uppermost position. As shown, the gripper members $50_1$, $50_2$ reside in the same (longitudinal) location on the axis of movement. The translating member 40 is shown as a translating platform that has apertures (40a, FIG. 10C) that slide over slide rails 41r as the actuator 41 rod advances and retracts.

Figure 14:
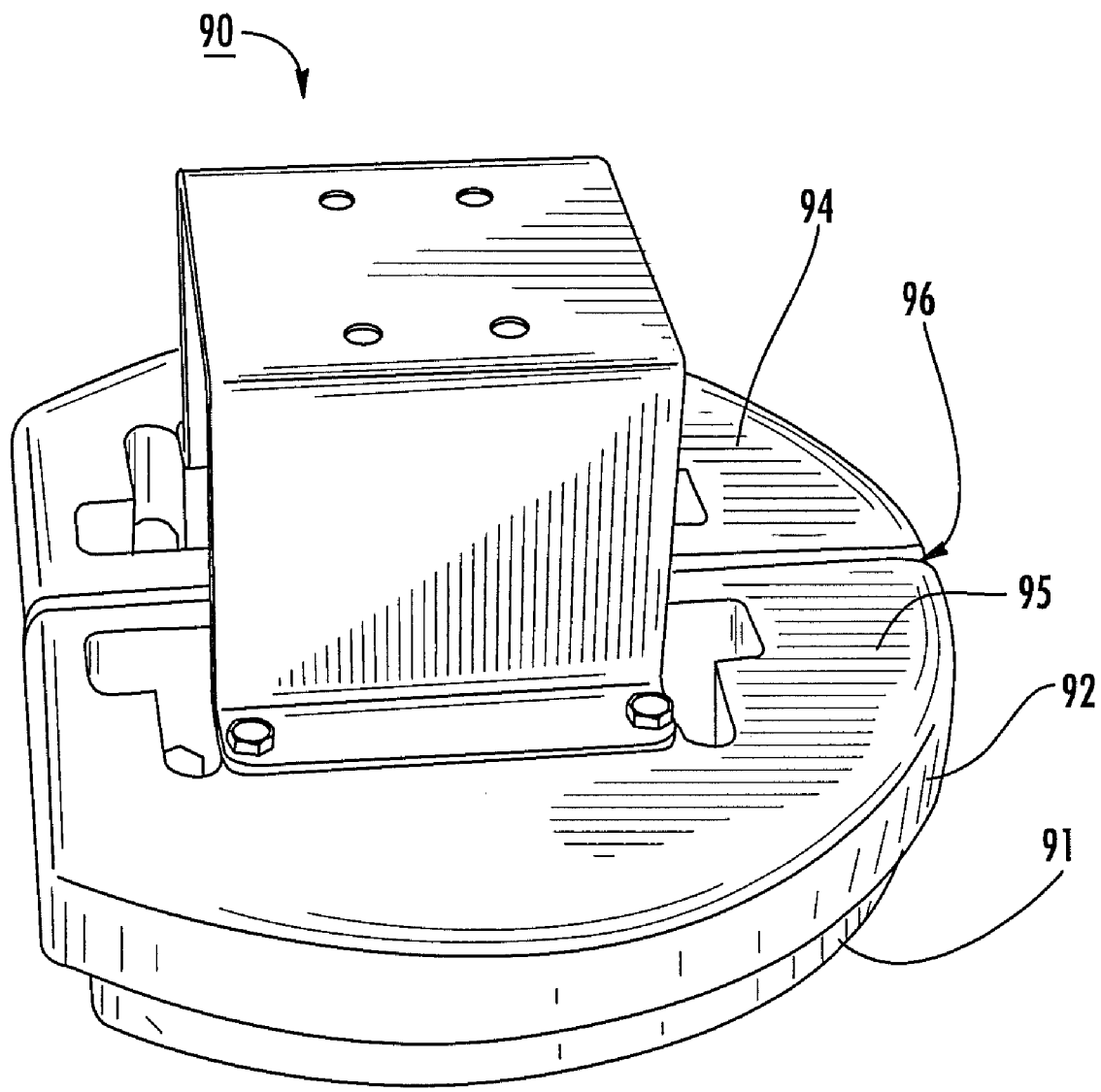
FIG. 14 is a side perspective view of the loading cap assembly shown in FIG. 13.

FIG. 12 illustrates a loading cap 90 sized and configured to reside inside the chute and extend above a first end of the chute 20 to help guide the covering material over the chute body (particularly away from any sharp or blunt leading edges). FIGS. 13 and 14 illustrate the loading cap 90. As shown, the loading cap 90 can have a first internal portion 91 that is sized and configured to reside a distance inside the chute 20 and a second external portion 92 overlying the first portion 91 with an increased cross-sectional area sufficient to cause the outer edge portions thereof to reside outside the bounds of the first end of the chute (FIG. 12). The second portion 92 of the loading cap 90 can have rounded outer edges 92r that contact covering material 30 being pulled over the chute 20 to inhibit contact with the edge of the chute 20. The loading cap 90 can facilitate the starting (leading) edge of the covering to be stretched down over the chute 20. The loading cap 90 can have a primary body that comprises a polymer such as Delrin® acetal homopolymer.

Figure 15:
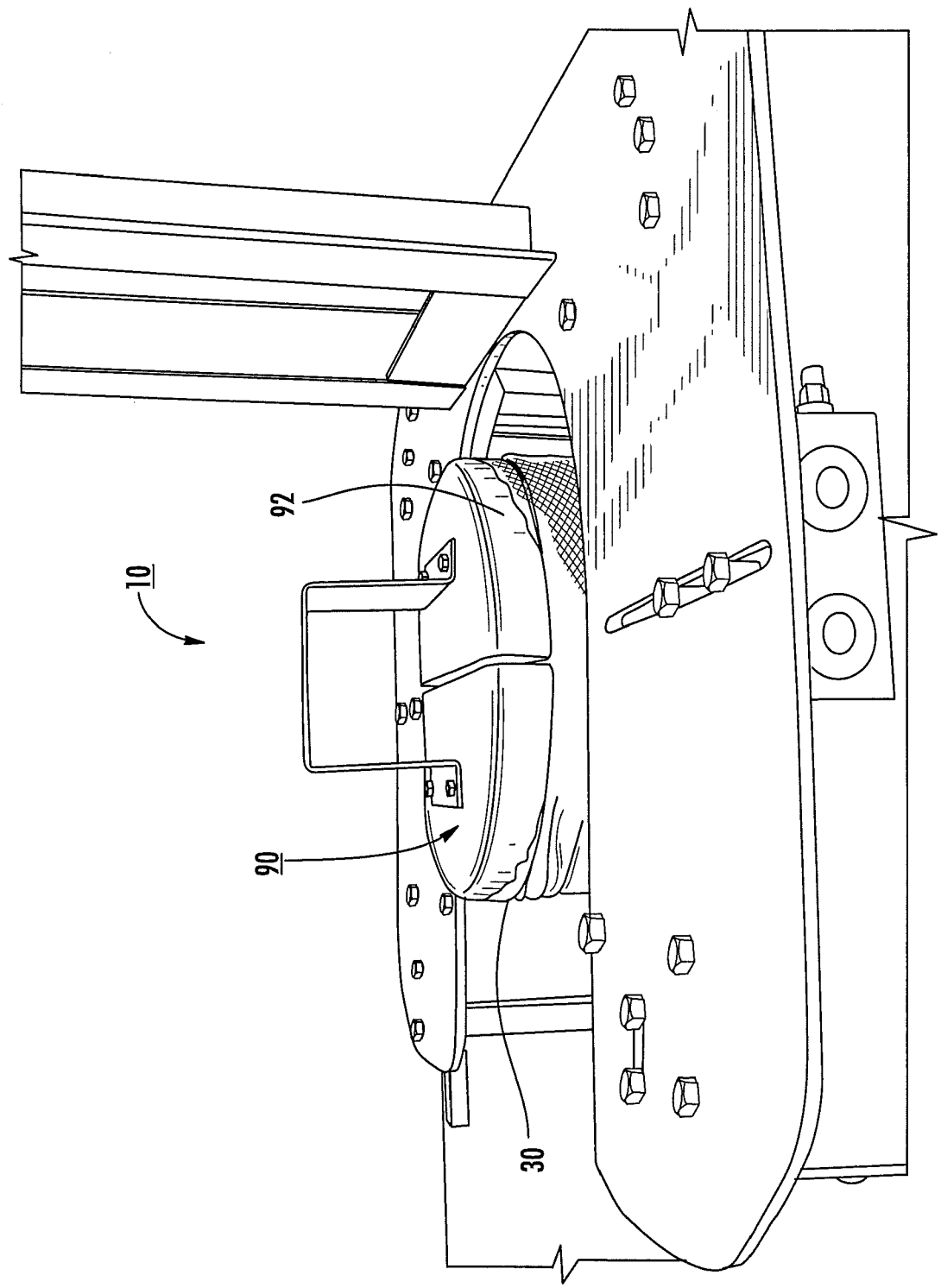
FIG. 15 is a side perspective view of the rucker shown in FIG. 6 with the chute and loading cap in position according to embodiments of the present invention.

As shown in FIGS. 13 and 14, the loading cap 90 can have a non-circular perimeter shape. In some embodiments, the loading cap 90 comprises spaced apart first and second members 94, 95 with a generally medial gap 96 therebetween. The first and second members 94, 95 can be spring loaded (98) to be able to compress or move side-to side between an expanded configuration before insertion into the chute 20 and a compressed position when in operative position in the chute 20 to snugly reside in the end portion of the chute abutting the inner wall thereof as shown in FIG. 15. The loading cap 90 can also include an upwardly extending handle that is attached to the first member 94 and the second member 95. As also shown, the first member 94 and second member 95 can be configured to be substantial mirror images of each other and define a loading cap 90 with a generally arcuate profile portion that merges into a generally planar portion.

FIGS. 16A-16G illustrate different exemplary gripper edge portion configurations, 50a-50g, respectively, and different examples of chute configurations 20a-20g, respectively. FIGS. 16A, 16B, 16C, 16E, 16F illustrate the use of two gripping members 50a, 50b, 50c, 50e, and 50f, each having similar or different shapes from each other and configured to accommodate different shaped chute cross-sectional shapes. The grippers (and/or gripper pads) can be interchangeable to operate with common gripper actuator(s) to allow the same nicker 10 to be used with different shape chutes. FIGS. 16D and 16G illustrates the use of three gripper members 50d, 50g, respectively.

Accordingly, embodiments of the present invention can accommodate differently shaped chutes, different grippers, different braking pressures, different stroke lengths for different length chutes, different coverings, and the like.

As discussed above, FIG. 17 illustrates that the operative orientation of the chute 20 and translating member 40 can be non-vertical, such as horizontal, with the gripping members $50_1$, $50_2$ configured to translate vertically.

The operation and/or sequence of events may be programmatically controlled by a programmable logic controller. Certain operations may be selected by an operator input using a Human Machine Interface ("HMI") to communicate with the controller as is well known to those of skill in the art.

Figure 18:
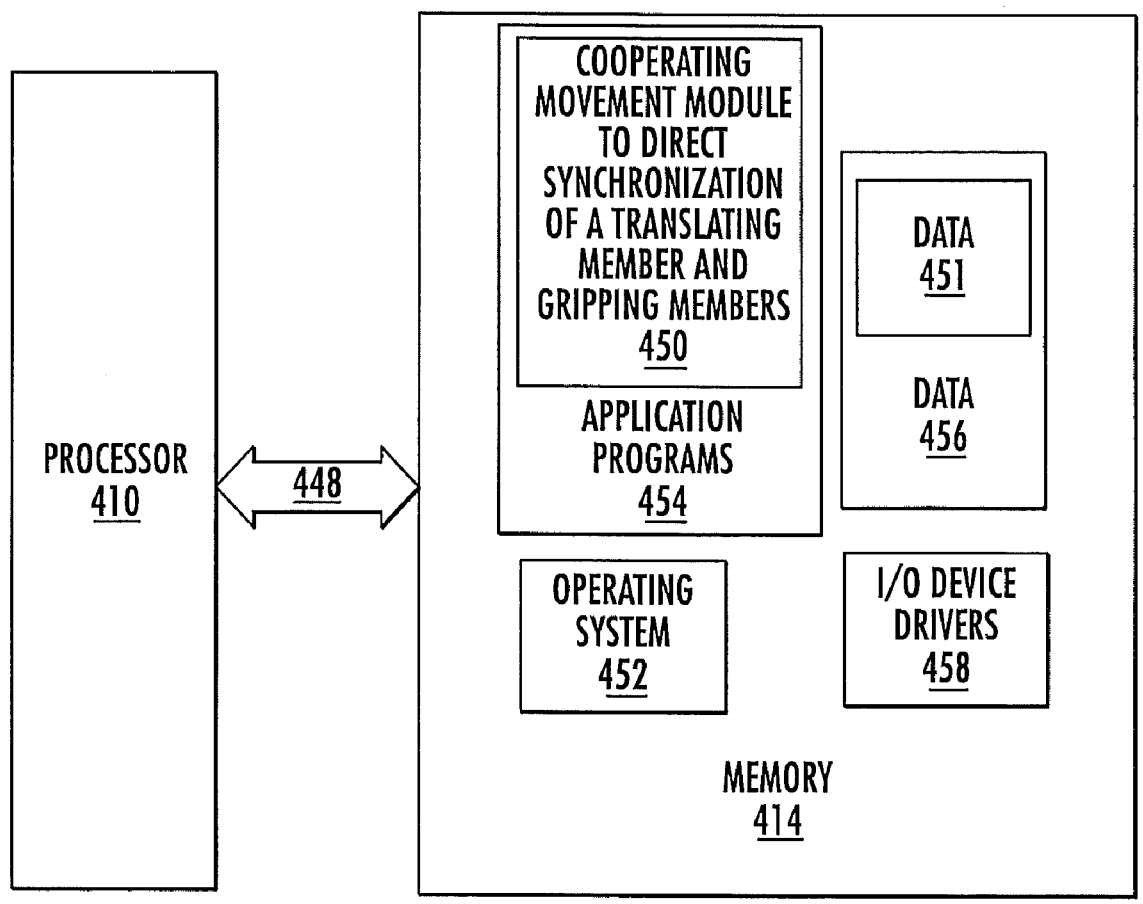
FIG. 18 is a block diagram of a data processing system/computer program according to embodiments of the present invention.

FIG. 18 is a block diagram of exemplary embodiments of data processing systems that illustrates systems, methods, and computer program products in accordance with embodiments of the present invention. The data processing systems may be incorporated in a programmable logic controller and/or be in communication therewith. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIG. 18, the memory 414 may include several categories of software and data used in the data processing system: the operating system 452; the application programs 454; the input/output (I/O) device drivers 458; Cooperating Movement Module to Direct Synchronization of a Translating Member and Gripping Members 450; and the data 456.

The data 451 may include a look-up chart of cycle times, synchronization data, different coverings, different chutes, covering material lengths, sensor feedback, safety interlock circuits and the like 456 corresponding to particular or target products for one or more producers, which may allow an operator to select certain operational parameters at the start of each shift, each rucking cycle, and/or production run and the like.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components. The application programs 454 are illustrative of the programs that implement the various features of the data processing system and preferably include at least one application, which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Module 450 being an application program in FIG. 18, as will be appreciated by those of skill in the art, other configurations may also be utilized while still benefiting from the teachings of the present invention. For example, the Module 450 may also be incorporated into the operating system 452, the I/O device drivers 458 or other such logical division of the data processing system. Thus, the present invention should not be construed as limited to the configuration of FIG. 18, which is intended to encompass any configuration capable of carrying out the operations described herein.

The I/O data port can be used to transfer information between the data processing system, the locking member, the translating member, the gripping members and/or another computer system or a network (e.g., the Internet) or to other devices controlled by the processor. These components may be conventional components such as those used in many conventional data processing systems that may be configured in accordance with the present invention to operate as described herein.

In some embodiments, the Module 450 is configured to allow a user to select certain parameters associated with a desired nicking stroke cycle. For example, a user can select a desired repetition frequency (speed), repetition cycles per sleeve and/or per product, gripper contact force, stroke distance, and the like.

The data 456 may include a look-up chart of different casing run times (i.e., for a type of netting, selectable length and the like corresponding to particular or target products for one or more producers. The data 456 may include data from a proximity sensor and/or exhaustion of a sleeve of material detector that allows the computer program to automatically control the operation of the rucker.

For example, certain embodiments of the present invention are directed to a computer program product in a computer readable medium with: (a) computer readable program code configured to direct the movement of a translating member to automatically reciprocally cause the product chute to move in opposing directions about an axis of movement with decreasing distance stroke cycles over a rucking operation; and (b) computer readable program code configured to direct a plurality of gripping members to automatically reciprocally move in a direction that is generally orthogonal to the axis of movement, with the movement of the gripping members being timed to cause the gripping members to snugly abut the product chute when the translating member is moving in the first direction and to cause the gripping members to move away from the product chute when the translating member is moving in the second direction.

The computer program product may also include computer readable program code that is configured to adjust the translating member and gripping member stroke cycles and the computer readable program code that is configured to adjust the stroke cycles may be configured to accept user input to select parameters associated therewith.

The computer readable program code that is configured to provide adjustable stroke cycles can be configured to provide a plurality of pre-programmed different selectable parameters including at least one of: (a) a plurality of translating member frequencies; (b) a plurality of gripper pressures; and/or (c) a plurality of gripper and/or translating stroke distances.

While the present invention is illustrated, for example, with reference to particular divisions of programs, functions and memories, the present invention should not be construed as limited to such logical divisions. Thus, the present invention should not be construed as limited to the configuration of FIG. 18 but is intended to encompass any configuration capable of carrying out the operations described herein.

The flowcharts and block diagrams of certain of the figures herein illustrate the architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An automated method of rucking sleeves of covering material onto a product chute, comprising:
   automatically reciprocally translating a product chute between a first direction and an opposing second direction about an axis of movement; and
   automatically reciprocally translating a plurality of gripping members substantially orthogonally to the axis of movement while the product chute is translating so that:
   (a) the gripping members abut the product chute while the product chute is traveling in the first direction; and
   (b) the gripping members are translating away from or are in a retracted configuration spaced apart from the product chute while the product chute is traveling in the second direction.

2. A method according to claim 1, wherein the reciprocally translating product chute step comprises decreasing axial stroke lengths whereby the chute is automatically translated at lesser distances over a rucking operation to pull covering material over different portions of the chute body.

3. A method according to claim 1, wherein the plurality of gripping members reciprocally translate substantially in concert with each other.

4. A method according to claim 1, wherein the gripping members comprise gripping surfaces that each occupy at least about 10% of the perimeter cross-sectional distance of the chute and cumulatively occupy less than about 70% of the perimeter cross-sectional distance.

5. A method according to claim 1, wherein the gripping members comprise four or less gripping members with gripping surfaces that combined provide a profile that is generally conformal to at least about 40% of a cross-sectional perimeter shape of the chute.

6. A method according to claim 1, wherein the plurality of gripping members is a pair of cooperating first and second gripping members.

7. A method according to claim 6, further comprising translating the cooperating members in concert and synchronized with the translation of the chute using respective actuators.

8. A method according to claim 7, wherein the gripping members are configured to define a non-circular profile chute contact configuration.

9. A method according to claim 6, wherein the first member has a generally planar chute contact configuration and the second member has a generally curvilinear chute contact configuration.

10. A method according to claim 1, further comprising inwardly compressing a spring-loaded loading cap and positioning the compressed loading cap into a first end portion of the product chute.

11. A method according to claim 1, further comprising pulling a fixed diameter covering material onto the product chute in response to the translating steps.

12. A method according to claim 1, further comprising pulling an elastically stretchable diameter covering material onto the product chute in response to the translating steps.

* * * * *